(12) United States Patent
Krishnamurthy et al.

(10) Patent No.: US 10,296,686 B1
(45) Date of Patent: May 21, 2019

(54) SWITCHING-ACTIVITY-BASED SELECTION OF LOW-POWER SEQUENTIAL CIRCUITRY

(71) Applicant: Apple Inc., Cupertino, CA (US)

(72) Inventors: Harsha Krishnamurthy, San Jose, CA (US); Ram Subramaniam Gandhi, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 14/968,022

(22) Filed: Dec. 14, 2015

(51) Int. Cl.
*G06F 17/50* (2006.01)

(52) U.S. Cl.
CPC ........ *G06F 17/5031* (2013.01); *G06F 17/505* (2013.01)

(58) Field of Classification Search
CPC .................................................. G06F 2217/78
See application file for complete search history.

(56) References Cited

U.S. PATENT DOCUMENTS

| | | | | |
|---|---|---|---|---|
| 8,966,425 B1* | 2/2015 | Eisenstadt | ........... | G06F 17/5077 716/120 |
| 9,038,006 B2 | 5/2015 | Moheban et al. | | |
| 2001/0045846 A1* | 11/2001 | Aksamit | ............. | H01L 27/0207 326/102 |
| 2003/0135836 A1* | 7/2003 | Chang | ................. | G06F 17/5045 716/119 |
| 2008/0021692 A1* | 1/2008 | Chaudhry | ............. | G06F 1/3203 703/18 |
| 2008/0320420 A1* | 12/2008 | Sferrazza | .............. | G06F 17/505 716/132 |
| 2009/0064070 A1* | 3/2009 | Kitahara | ............. | G06F 17/5068 716/113 |
| 2014/0181779 A1* | 6/2014 | Cao | ........................ | G06F 17/505 716/134 |

OTHER PUBLICATIONS

Jerry Frenkil and Jan M. Rabaey, "Low Power Design Methodologies and Flows," Part of the series Integrated Circuits and Systems, Feb. 28, 2009, 52 pages.
Low-Power Synthesis Option, White Paper, Cadence Design Systems, Inc., 2001, 18 pages.

* cited by examiner

*Primary Examiner* — Vuthe Siek
*Assistant Examiner* — Aric Lin
(74) *Attorney, Agent, or Firm* — Meyertons, Hood, Kivlin, Kowert & Goetzel, P.C.

(57) ABSTRACT

Techniques are disclosed relating to reducing dynamic power consumption in integrated circuits. In some embodiments, simulation is performed at one or more stages of a circuit design to identify portions of the circuit with relatively high average clock switching activity, based on an amount of clock gating during the simulation by one or more clock gaters. In some embodiments, sequential circuit elements in the identified portions are specified as candidates for implementation using low-power sequential circuitry. Examples of low-power sequential circuitry include multibit flip flops and flip flops with low clock pin input capacitance. The disclosed techniques may allow automated design tools to significantly reduce dynamic power consumption while still meeting other design parameters such as timing constraints.

14 Claims, 5 Drawing Sheets

---

Perform a simulation of a circuit design using design information that specifies a clock tree with a plurality of hierarchically arranged clock gating elements
*610*

Determine a portion of the clock tree based on an amount of clock gating, during the simulation, by one or more of the clock gating elements that are configured to gate clock signals to the portion of the clock tree
*620*

Select at least a portion of sequential circuit elements coupled to the portion of the clock tree to be implemented in the circuit design using a low-power cell for performing a particular circuit function, where the low-power cell has lower switching power consumption per bit relative to one or more other types of cells used to implement the particular circuit function within the circuit design
*630*

SWITCHING-ACTIVITY-BASED SELECTION OF LOW-POWER SEQUENTIAL CIRCUITRY

BACKGROUND

Technical Field

This disclosure relates generally to integrated circuits and more specifically to techniques for reducing clock tree switching power consumption.

Description of the Related Art

Power associated with clock switching is typically a significant contributor to dissipated power in microprocessors and other relatively high-frequency integrated circuits. Techniques for reducing clock tree power associated with particular cells (such as flip flops or latches) include using low-power sequential circuitry. Examples of low-power sequential circuitry include multi-bit cells and cells with low clock pin capacitance. Multibit cells combine multiple storage elements into a standard cell with shared clock circuitry and wiring to reduce clock switching capacitance and power. Single-bit cells may have low clock pin capacitance, relative to other cells with the same functionality, but may have different area and/or timing characteristics relative to the other cells.

Sequential logic in a design is typically automatically mapped to standard cells by logic synthesis tools and/or manually mapped into register-transfer level (RTL) files. Because low-power sequential circuitry tends to be slower and/or larger than other sequential circuitry implementations, it is difficult to introduce low-power sequential cells into circuit designs in the context of automated design tools. These tools typically attempt to optimize timing and area such that low-power circuitry is replaced with faster and/or smaller alternatives.

SUMMARY

Techniques are disclosed relating to reducing dynamic power consumption in integrated circuits. In some embodiments, simulation is performed at one or more stages of a circuit design to identify portions of the circuit with relatively high average clock switching activity, based on an amount of clock gating during the simulation by one or more clock gaters. In some embodiments, sequential circuit elements in the identified portions are selected for replacement with low-power sequential circuitry. Examples of low-power sequential circuitry include multibit flip flops and flip flops with low clock pin input capacitance. The selected circuitry may eventually be switched back to higher-power cells, based on further analysis later in the design process. For example, selected circuitry may not be implemented using low-power cells based on timing constraints and/or power consumption by corresponding combinational circuitry. The disclosed techniques may allow automated design tools to significantly reduce dynamic power consumption while still meeting other design parameters such as timing constraints.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computing device configured synthesize a circuit design" is intended to cover, for example, a computer that has computer code and/or circuitry that performs this function during operation, even if the computer in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

DETAILED DESCRIPTION

Clock Tree Overview

Figure 1:
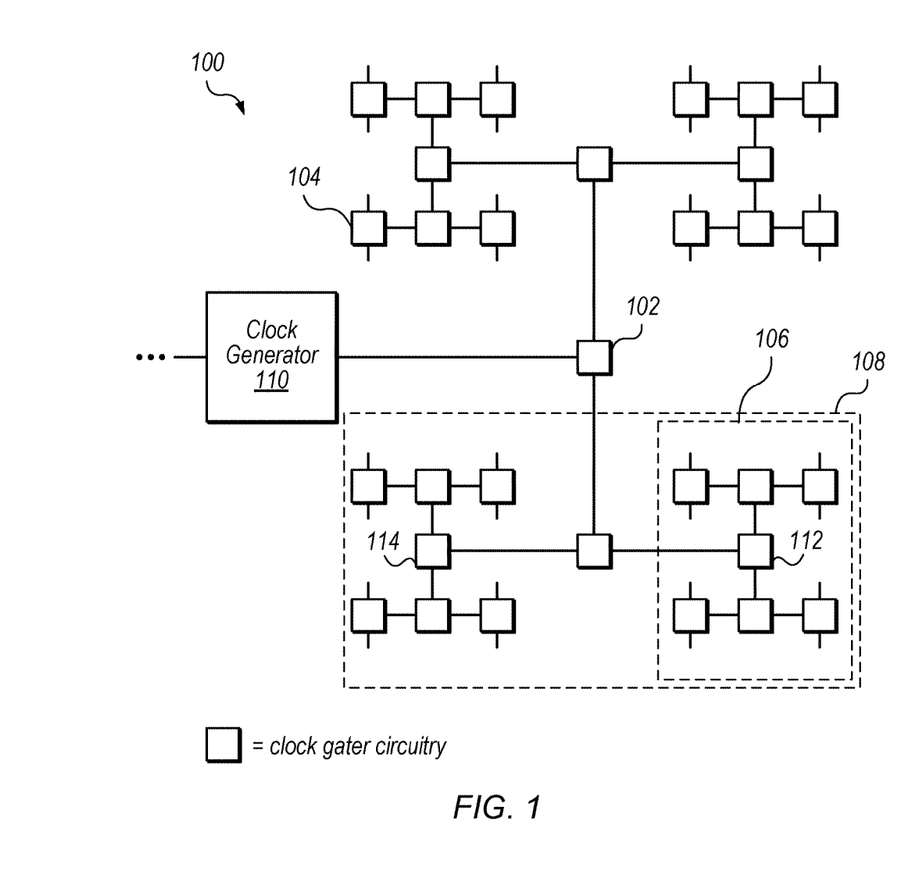
FIG. 1 is a block diagram illustrating an exemplary clock tree with hierarchical clock gating elements, according to some embodiments.

FIG. 1 is a block diagram illustrating exemplary clock tree circuitry in a device 100 according to some embodiments. In the illustrated embodiment, clock generator 110 is configured to generate clock signals that are propagated to various circuitry to drive sequential circuitry. As used herein, "sequential circuitry" refers to circuitry whose output depends on its past input(s) as well as the present value(s) of its input signal(s). Thus, sequential logic has a state. In contrast, the output of combinational circuitry is a function of its present input only. Examples of sequential logic include latches and flip-flops. Examples of combinational logic include traditional adders and multiplexers. Sequential logic often changes state based on the edges of clock signals, such as signal generated by clock generator 110. In the illustrated embodiment, the sequential logic that receives clock signals from clock generator 110 is not explicitly shown, but may be positioned throughout device 100. In various embodiments, combinational circuitry may be coupled to the sequential circuitry.

In the illustrated embodiment, the clock tree is arranged using progressively smaller "H" structures so that clock edges will propagate to different portions of device 100 at approximately the same time. In other embodiments, any of various clock tree arrangements may be implemented. In the illustrated embodiment, clock gater circuitry is dispersed along the clock tree in a hierarchical manner. For example, clock gater 102 may be described as a highest level in the clock gater hierarchy as it is closest to clock generator 110 and clock gater 104 may be described as a lowest level in the clock gater hierarchy because it is among the clock gaters that are furthest from the clock gater in a tree of clock gaters (assuming there are no lower levels that are not shown). If a given clock gater is gating the clock signal, circuitry below that clock gater in the hierarchy will not receive clock signals. Clock gating may occur when the circuitry is not currently being used, for example, for a current task being performed by device 100. Clock gating may significantly reduce dynamic power consumption in this circuitry, in some embodiments.

Figure 2:
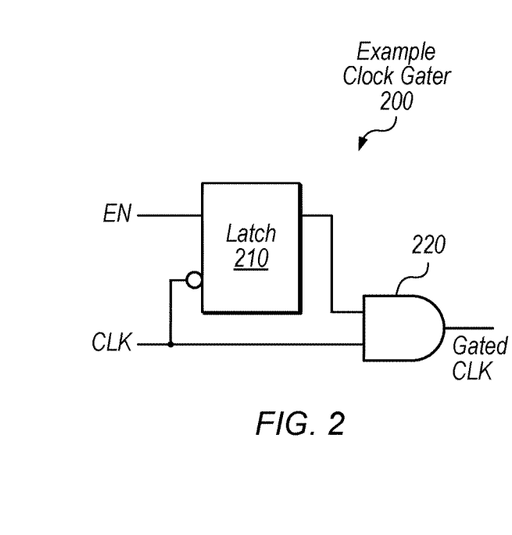
FIG. 2 is a block diagram illustrating an exemplary clock gater, according to some embodiments.

FIG. 2 shows an example clock gater 200 according to some embodiments. In the illustrated embodiment, clock gater 200 includes a latch 210 and an AND gate 220. In the illustrated embodiment, the input to the latch that receives the CLK signal is inverted. In the illustrated example, clock gater 200 is configured to simply buffer the CLK signal when the enable (EN) signal is asserted but is configured to gate the clock signal (such that gated CLK stays low) when the EN signal is not asserted. Clock gaters may be implemented using various circuit topologies and clock gater 200 is shown for illustrative purposes and is not intended to limit the scope of the present disclosure. In other implementations the gated CLK signal may stay high when the EN signal is not asserted and/or a disable signal may be used input instead of an enable signal, etc.

When performing typical tasks (e.g., executing computer programs for embodiments in which device 100 is a processor), different portions of device 100 may have different average clock switching activity. For example, different clock gaters in the hierarchy may gate the clock signal more or less often, on average, during these tasks.

Consider an exemplary task in which clock gater 112 is configured to clock gate for the entire first half of a one-second task and clock generator 110 is configured to generate a 1 GHz clock. In this example, the average clock switching activity for circuitry in portions 106 is at most 0.5 GHz. Note that the average clock switching activity may be lower for portions of this portion, depending on whether clock gaters that are lower in the hierarchy than clock gater 112 also clock gate during the task. Now consider a situation in which clock gater 114 is configured to clock gate for 90% of the one-second task. In this example, the average clock switching activity for circuitry receiving clock signals from clock gater 112 is at most 0.1 GHz. Thus, portion 108 is a high-activity portion of the clock tree relative to the portion corresponding to clock gater 114, in this example. Portions may be defined at one or more of various granularities. Illustrated portions 106 and 108 show two granularities of portions, but portions may be identified and tracked for average clock switching activity at any of various granulates. Portions may be defined logically, and thus may or may not have physical characteristics, although circuitry in a logical portion may typically be located near other circuitry in the portion, in a physical design layout. In various embodiments, average clock switching activity may be determined based on any of various appropriate various units, including cycles per time interval, percentage of time in which a clock is gated, etc. In some embodiments, there may be one or more clock dividers in the clock tree, resulting in multiple different clock frequencies, which may also affect the determined average switching activity. In other embodiments, the entire clock tree may operate at the same frequency.

In some embodiments, automated circuit design tools are configured to attempt to use low-power sequential circuitry in high-activity portions of the clock tree, based on one or more simulations.

Examples of low-power sequential circuitry include multi-bit circuitry and circuitry with low clock pin input capacitance. Circuit elements are typically selected from among multiple standard cells. For example, for a given type of flip flop, multiple cells may be available and one of the types may have lower clock pin capacitance than the other cells. This low-power cell type may have lower average dynamic power consumption than the other cells. Traditional automated synthesis tools, however, would typically optimize away such cells because they typically select cells to reduce processor area and/or timing. In some embodiments, automated synthesis tools are configured to use cells with low input capacitance in clock tree portions with high average switching activity based on one or more simulations.

Further, multiple circuit elements may be implemented using a single multi-bit cell that shares a clock input and wiring among the elements. Although multi-bit circuitry may consume more dynamic power than a single one of the instances of the circuit element it replaces, it generally consumes less dynamic power than the entirety of the instances that it replaces. Thus, utilizing such multi-bit circuitry may reduce overall dynamic power consumption. Said another way, both circuitry with low clock pin input capacitance and multibit circuitry has lower switching power consumption per stored bit of state information, relative to other types of cells. Therefore, in some embodiments, automated synthesis tools are configured to multi-bit cells in clock tree portions with high average switching activity based on one or more simulations.

In other embodiments, still other types of low-power sequential circuitry may be implemented in design environments where multiple types of circuit elements are available for a given circuit functionality. The disclosed multi-bit and low-clock-pin-capacitance cells are discussed for illustrative purposes but are not intended to limit the scope of the present disclosure.

Using low-power sequential circuitry may adversely affect timing slack and/or increase power consumption by combinational circuitry. Therefore, in some embodiments, synthesis tools are configured to selected sequentials for potential implementation using low-power sequential circuitry, but delay making a hard decision about whether or not to actually implement the low-power sequential circuitry until later in the design process (e.g., the cells may later be re-mapped to higher-performance cells).

Overview of Circuit Design Process

Figure 3:
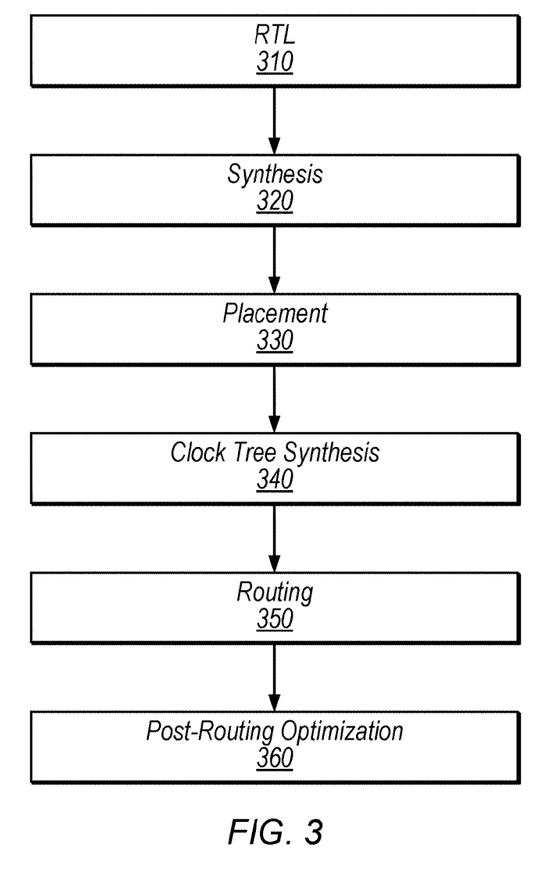
FIG. 3 is a flow diagram illustrating exemplary circuit design steps, according to some embodiments.

FIG. 3 is a flow diagram illustrating an exemplary design process, according to some embodiments. In the illustrated embodiment, the process starts with an RTL description 310 of a circuit design. The RTL description may be stored as a file and may be written in a hardware description language such as Verilog, for example. In other embodiments, other high-level description files may be used to represent the circuit design, in addition to and/or in place of RTL. In some embodiments, simulation is performed on the RTL description of the circuit to determine portions with high average clock switching activity. In various embodiments, simulations may be performed at any of various steps in the design process in addition to and/or in place of RTL simulation.

Synthesis step 320, in the illustrated embodiment, may generally involve transforming an abstract description of desired circuit behavior (e.g., as specified in RTL) into a design implementation in terms of logic gates. This may include compiling the RTL description (which may be performed incrementally), mapping circuit elements to logic cells of one or more particular logic technologies, inserting scan circuitry for testing purposes, performing technology-dependent optimizations, etc. Synthesis may generate a netlist which may be used in subsequent design steps.

Placement step 330, in the illustrated embodiment, may generally involve placing circuit elements in physical locations in a chip area for the circuit design. Placement may be based on various constrains, such as total wirelength for routing between circuit elements, timing, routing congestion (which may cause excessive detours or prevent completing all paths), power considerations (such as overall consumption, hot spots, and/or temperature gradients), etc. Placement may be performed hierarchically, e.g., with global placement of design blocks preceding detailed placement of circuit elements. In some embodiments, placement involves multiple phases such as pre-placement optimization (which may alter the netlist by collapsing elements or downsizing cells, for example), in-placement optimization (e.g., based on virtual routing, this may include cell sizing, cell moving, bypassing, net splitting, gate duplication, buffer insertion, area recovery, etc.), and/or post-placement optimization (which may include fixing timing issues based on an ideal clock prior to clock tree synthesis and/or based on the propagated clock after clock tree synthesis). It is evident, e.g., based on the preceding description, that simulation of circuit timing typically becomes more accurate later in the design flow. Therefore, the set of circuitry implemented in the design using low-power sequentials may be gradually added to or reduced as the flow proceeds.

Clock tree synthesis step 340, in the illustrated embodiment, may involve routing clock tree paths, e.g., corresponding to the clock tree shown in FIG. 1. Clock tree synthesis may attempt to reduce or minimize clock skew, delay, total wirelength, noise, and/or coupling effects, for example. In some embodiments, the clock may be skewed intentionally to improve setup slack, for example. In some embodiments, hold slack may improve after clock tree synthesis.

Routing step 350, in the illustrated embodiment, may involve globally allocating resources for paths between circuit elements and assigning specific metal layers and/or tracks for particular paths.

Post-routing optimization step 360, in the illustrated embodiment, may involve any of various optimizations to reduce power consumption, meet timing constraints, comply with technology requirements, maintain consistency with the original netlist, meet electrical rules, etc.

The design steps of FIG. 3 are shown for illustrative purposes and are not intended to limit the scope of the present disclosure. In some embodiments, the process may be performed with some steps omitted, new steps added, any of various steps performed iteratively, steps performed in a different order than shown, etc. In various embodiments, design automation tools may be configured to implement low-power sequential circuitry based on simulated average clock switching activity at various steps in the design process.

Figure 4:
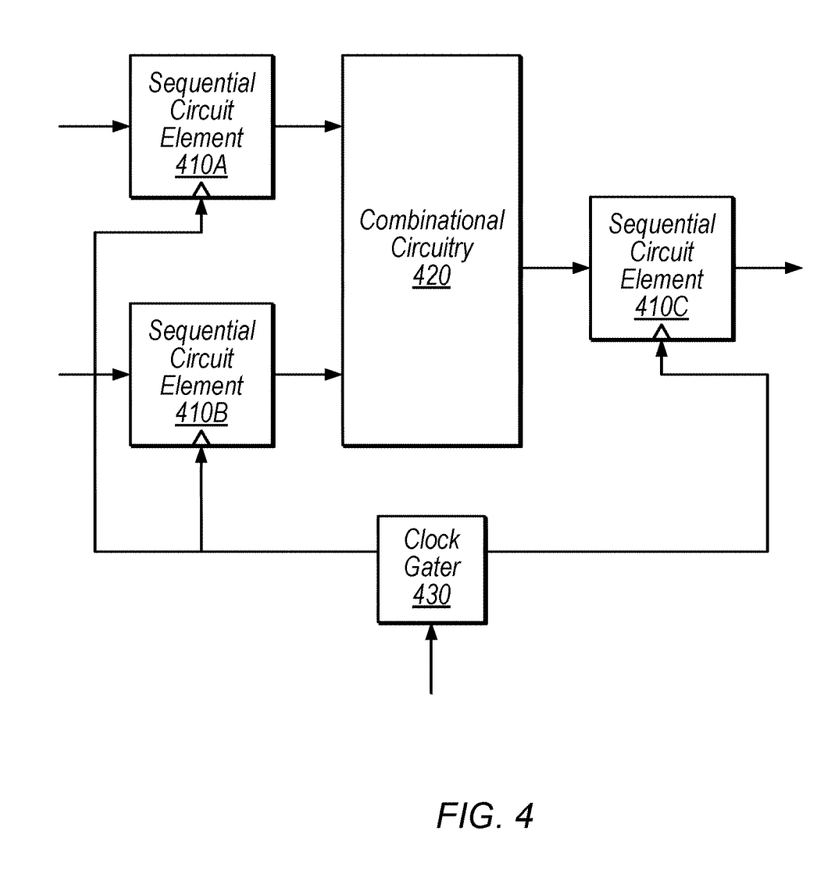
FIG. 4 is a block diagram illustrating exemplary coupling of sequential circuitry, combinational circuitry, and a clock gater, according to some embodiments.

FIG. 4 is a block diagram illustrating an exemplary portion of a circuit design, according to some embodiments. In the illustrated embodiment, sequential circuit elements 410A and 410B are configured to receive data from unshown circuitry to the left of the illustration and provide outputs to combinational circuitry 420 based on clock signals that are received via clock gater 430. In the illustrated embodiment, combinational circuitry 420 is configured to generate output signals that are clocked into sequential circuit element 410C based on clock signals received via clock gater 430. In various embodiments, sequential circuitry elements 410 may be candidates for replacement with low-power sequential circuitry based on the average clock activity through clock gater 430. In some embodiments, however, this replacement may not occur, e.g., based on negative timing slack and/or power consumption by combinational circuitry 420. Further, different sequential circuitry of the same type in the same portion (e.g., in a situation where elements 410A and 410B are both the same type of flip-flop) may be implemented using different cells. For example, if element 410A is on a critical timing path and 410B is not, it may be more likely that the disclosed tools will implement element 410B using low-power sequential circuitry.

Example Method for Mapping Low-Power Sequential Circuitry

Figure 5:
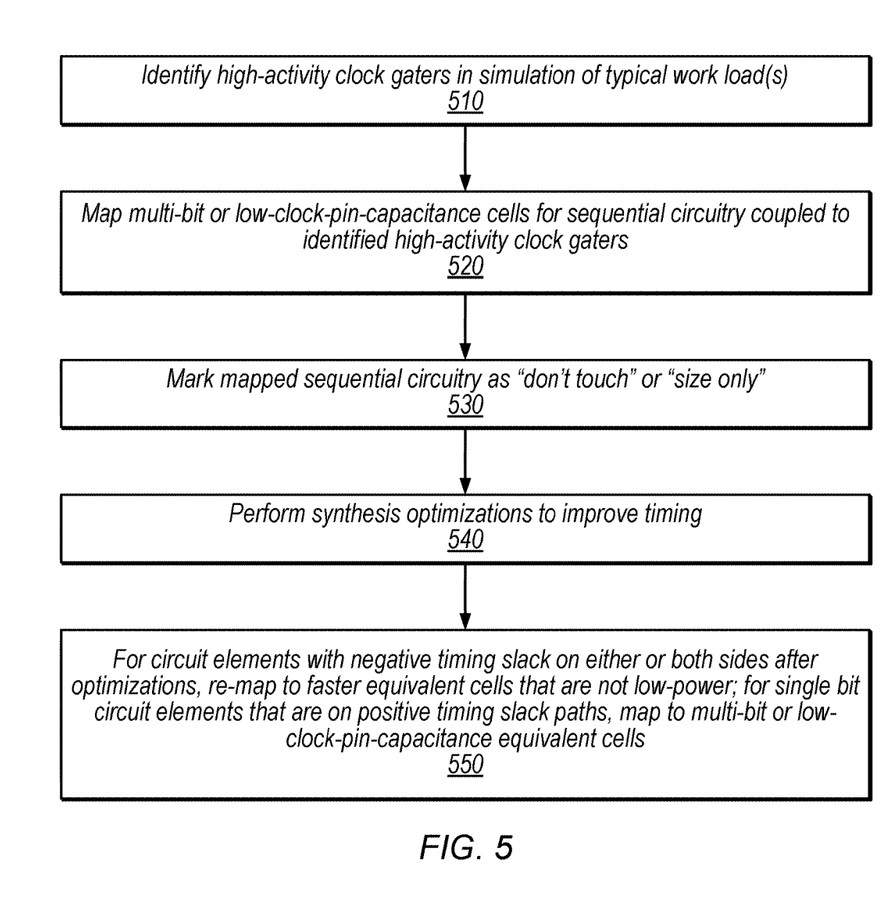
FIGS. 5-6 are flow diagrams illustrating methods for implementing low-power sequential circuitry based on simulated average clock switching activity, according to some embodiments.

FIG. 5 is a flow diagram illustrating a method for implementing low-power sequential circuitry, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 510.

At 510, in the illustrated embodiment, a design tool executed by a computing system identifies high-activity clock gaters in a simulation of typical work load(s) for a circuit design. In some embodiments, the simulation is performed based on an RTL specification of the circuit design. The simulation may identify various portions with relatively high average clock switching activity (e.g., based on corresponding clock gaters that do not clock gate very often during the simulation). The portions may be identified based on various thresholds. For example, portions with switching activity above a particular number of average cycles per second may be identified. As another example, portions that fall within the top N percent of portions at a particular clock tree level based on average cycles per second may be identified. In other embodiments, other thresholds may be utilized to identify high-activity clock gaters based on one or more simulations. The identification may be performed as part of the simulation or may be performed separately, e.g., by examining output data from the simulation.

At 520, in the illustrated embodiment, the design tool maps low-power sequential circuitry (multi-bit or low-clock-pin-capacitance cells in the illustrated embodiment) for sequential circuitry coupled to identified high-activity clock gaters. Using low-power circuitry for these sequential elements may significantly reduce power consumption, as these elements in the design have been determined to have relatively high input clock activity for typical loads.

In some embodiments, the design tool may refrain from mapping certain elements to low-power sequentials at this stage based on other considerations. For example, the design tool may not map elements that are in the top N percent of contributors to negative timing slack.

At 530, in the illustrated embodiment, the design tool marks the circuitry that was mapped to low-power cells as "don't touch" or "size only." This may prevent automated design tools from replacing these cells with faster or smaller cells, for example, at least until late design stages.

At 540, in the illustrated embodiment, the design tool performs synthesis optimizations to improve timing. This may include, for example, detecting any paths that have negative timing slack and end at any of the low-power sequential circuitry (e.g., the path ending at element 410B of FIG. 4). For these paths, the design tool may check timing slack on the output side (e.g., the path from element 410B to sequential element 410C) and, if there is a positive margin, delay the clock to the low-power sequential circuitry to help with setup timing. The design tool may be configured to perform various optimizations at different design stages in an attempt to retain the low-power sequential circuitry while still meeting design constraints.

At 550, the design tool identifies circuit elements with negative timing slack on either or both sides after optimizations and remaps those elements to faster equivalent cells (e.g., cells that are not low-power sequential cells). This may increase power consumption but may be necessary to meet design constraints. In some embodiments, the design tool may also remap elements coupled to combinational circuitry with high power consumption to faster cells, which may reduce overall power consumption by reducing the power consumption of the combinational circuitry. In the illustrated embodiment, the design tool also maps single-bit circuit elements that are on paths with positive timing slack to multi-bit or low-clock-pin-capacitance equivalent cells.

In some embodiments, the method may further include performing steps 520 and/or 550 before and/or after various design steps. For example, mapping sequentials to lower-power cells based on simulated switching activity and/or re-mapping lower-power cells to higher-power cells based on design constraints (such as timing) may be performed during placement stages, CTS stages, routing stages, post-routing optimization stages, etc. Circuitry may be mapped to lower-power cells or re-mapped to higher-performance cells at each stage, in some embodiments.

Overall the method shown in FIG. 5 may significantly reduce dynamic power consumption by placing low-power sequential circuitry in portions with higher average clock activity while still meeting design constraints. The steps shown in FIG. 5 may be performed at one or more of various stages of the design process of FIG. 3, in various embodiments.

Various operations are described herein as being performed by automated design tools. In other embodiments, at least portion of these operations may be performed manually and/or based on manually-adjusted input parameters.

Example Tools

In some embodiments, various tools may be configured to perform operations to select/remove low-power sequential elements and/or perform other optimizations at various design stages.

In some embodiments, a multi-bit (MB) sequential mapper tool is configured to merge flip-flops and/or latches that are clock equivalent in order to use MB sequential circuitry for these circuit elements. In various embodiments, the selection of circuit elements for merging is based on average clock pin activity from simulation, as discussed above. Further, the MB mapper tool may be configured to adjust timing slack on the input and/or output sides of sequential circuit elements. For example, the MB mapper may determine whether there is negative timing slack on paths ending at sequential elements in a design that are currently implemented using low-power cells. In response to detecting negative timing slack the MB mapper may determining whether there is positive slack on output paths from the low-power elements. If there is positive slack, the MB mapper may adjust (e.g., during incremental synthesis) the design, e.g., to delay the clock to the circuitry with negative input timing slack in order to help the setup time. In some embodiments, the MB mapper is also configured to adjust spatial location of sequential circuitry in order to reduce dynamic power consumption.

The MB mapper may perform operations at various stages of the circuit design process, including but not limited to: pre-synthesis, post-mapping (e.g., within synthesis step 320), placement, post-clock-tree-synthesis, and/or post-route optimization.

The MB mapper may gather clock activity information from RTL simulation and/or from various other simulations and simulation and synthesis tool runs, such as signoff tool iterations. Such tools may include activity-based power measurement tools, e.g., configured to operate on gate-level netlist/schematics with wire parasitics (e.g., based on resistance and capacitance). In some embodiments, the MB mapper may perform path margining by over-constraining timing parameters to attempt to create additional timing slack (e.g., by signaling to other tools "work harder" to optimize timing on certain paths relative to others). Additional timing slack may facilitate insertion of low-power circuitry that is slower than non-low-power cells for the same function. In some embodiments, scan chains (e.g., for circuit testing) are stitched after each merge. Speaking generally, the disclosed tools may be scan-aware such that their optimizations do not break scan chains.

In some embodiments, a MB splitter tool is configured to split circuit elements that are currently specified as multi-bit sequentials in a design into single-bit elements. In some embodiments, the MB splitter is configured to split cells based on worst negative slack (WNS) and/or total negative slack (TNS) timing parameters. Worst negative slack corresponds to the path having the greatest negative slack while total negative slack corresponds to the sum of negative slack across the design or a particular portion of the design. Generally, positive slack means that a signal could arrive earlier at a node without affecting timing constraints while negative slacks means that a signal needs to arrive later (or the path must otherwise be sped up) in order to avoid violating timing constraints. In some embodiments, the MB splitter uses knee-based identification to decide how much circuitry to split. For example, timing improvement per split typically diminishes after splitting the MB circuitry that contributes most to negative slack. Identifying the "knee" in the curve where additional splits no longer significantly improve timing may facilitate splitting a desirable amount of MB circuitry. In some embodiments, scan chains are stitched after each split.

The MB splitter may perform operations at various stages of the circuit design process, including but not limited to:

post-mapping, placement, post-clock-tree-synthesis, and post-route optimization. Thus, in some embodiments, the MB splitter is configured to allow MB circuitry to remain in a design even when timing constraints are not met. This may be useful, for example, because timing determinations typically become more realistic later in the design process. Therefore, retaining MB circuitry even when timing constraints are not initially satisfied may increase the overall use of MB circuitry, e.g., when timing parameters change later in the design.

In some embodiments, a power-based swapper tool is configured to replace cells with lower-power cell types with the same functionality. In some embodiments, the power-based swapper is configured to swap cells with relatively high average switching activity in simulation with equivalent cells with low clock pin input capacitance, for example. In some embodiments, the power-based swapper is configured to swap cells that have positive timing slack, or negative slack that is smaller than a particular threshold, for example.

In some embodiments cells are included in libraries and characterized for power and timing. In some embodiments, multiple lower-power cells may be available. In some embodiments, the lowest-power cells that do not break timing constraints may be selected.

The power-based swapper may be implemented in various stages of the circuit design, including but not limited to post-mapping, placement, post-clock-tree-synthesis, post-route optimization, and sign-off timing.

In some embodiments, a timing-based swapper tool is configured to replace cells in the design with faster variants. In some embodiments, the timing-based swapper is configured to identify cells based on negative slack. In some embodiments, the timing-based swapper may (1) optimize timing and (2) reduce power consumption by combinational circuitry. The timing-based swapper may be configured to select the lowest-power cell that meets timing constraints.

The timing-based swapper may be implemented in various stages of the circuit design, including but not limited to post-mapping, placement, post-clock-tree-synthesis, post-route optimization, and sign-off timing.

In some embodiments, a combinational power tool is configured to identify portions of the circuit design with high combinational power consumption. These portions may be cones of logic corresponding to particular sequential circuitry. These portions may be identified using tools generally associated with RTL simulation and synthesis, for example. In some embodiments, using higher-speed sequential circuitry coupled to these portions may reduce power consumption by the combinational circuitry. Generally, there may be a tradeoff between switching power consumption and combinational power consumption for these portions. In some embodiments, a knee identification technique is used to determine portions with higher-power combinational logic and the combinational power tool is configured to substitute higher-speed sequential cells for this portion.

The combinational power tool may be implemented in various stages of the circuit design, including but not limited to post-mapping, placement, post-clock-tree-synthesis, and post-route optimization.

Speaking generally, using the tools described above at different design stages may result in a dynamically-changing set of circuit elements currently implemented using low-power sequential circuitry. For example, after simulation based on RTL, an initial set of circuit elements may be selected, based on relatively high average switching activity during simulation. After further design steps (which may involve further simulation), some of the selected circuit elements may be un-selected or replaced (e.g., by the MB splitter and/or the timing-based swapper) and/or additional circuit elements may be selected for implementation using low-power cells (e.g., by the MB merger and/or the power-based swapper). Thus, throughout various different design stages (and/or iterations within particular design stages), the set of circuitry selected for implementation using low-power sequentials may be changed. Eventually, a currently-selected set at the end of the design process is physically implemented using low-power circuitry.

"Selecting" circuitry as a implementation for low-power sequential circuitry includes changing a variable associated with the circuitry. It also includes tentatively assigning a cell type for the circuitry. If the tentatively-assigned cell type is not changed prior to the final design, then the circuitry may be implemented using the cell type.

In various embodiments, the decisions described above (e.g., swapping cell types) may be soft decisions throughout most of the design process (and thus may be changed) and/or may be based on various weighting factors. For example, rather than a cutoff threshold for replacing sequentials based on average switching activity, the average switching activity may be used as a weighting factor such that higher average activity is more likely to cause a cell swap and lower average activity is less likely to cause a cell swap, according to some defined formula. Other examples of weighting factors include combinational power consumption, timing parameters such as positive or negative slack, etc.

Another Example Method

Figure 6:
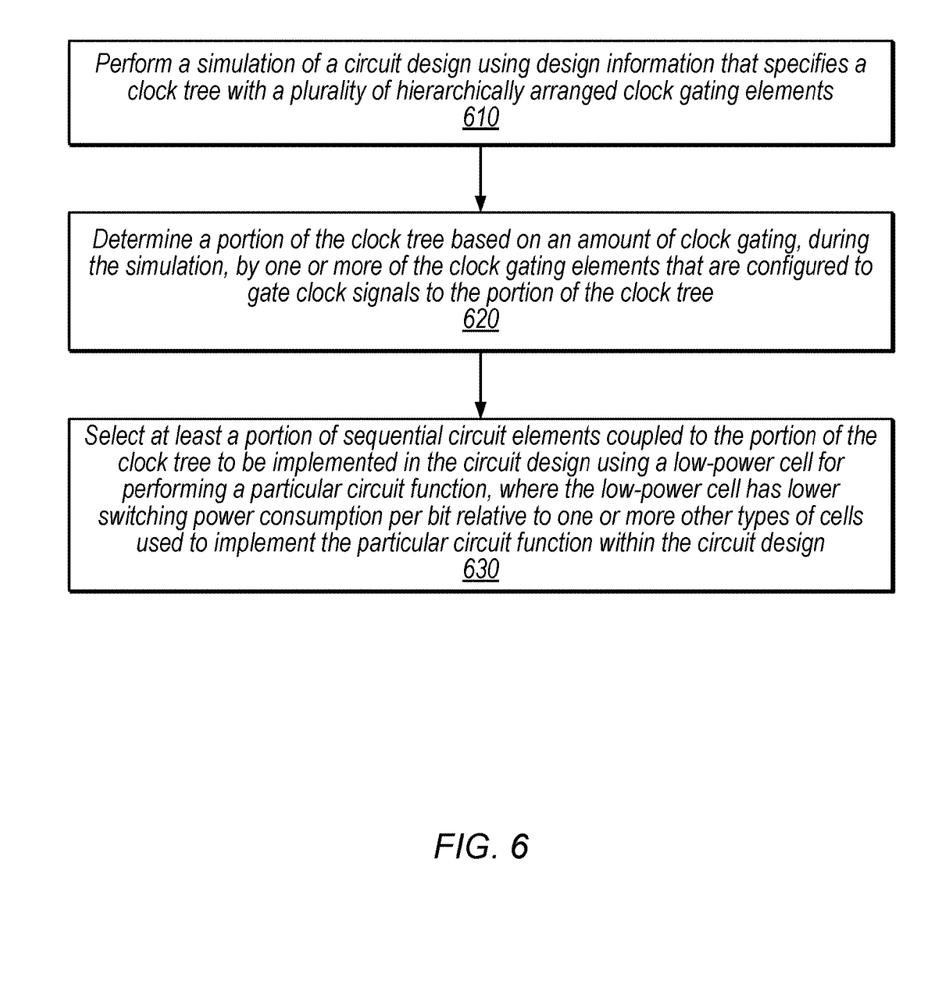

FIG. 6 is a flow diagram illustrating another method for implementing low-power sequential circuitry, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. Flow begins at 610.

At 610, in the illustrated embodiment, a computing device performs a simulation of a circuit design using design information that specifies the circuit design, including a clock tree with a plurality of hierarchically arranged clock gating elements. The design information may be an RTL file or may be generated based on processing an RTL file, for example. The simulation may include multiple common workloads. The simulation may be performed at any of the various design stages discussed herein, among others, as appropriate.

At 620, in the illustrated embodiment, the computing device determines a portion of the clock tree based on an amount of clock gating, during the simulation, by one or more of the clock gating elements that are configured to gate clock signals to the portion of the clock tree. This portion (which may be one of multiple identified portions) may have relatively high average clock switching activity, for example. The determination may be performed as part of the simulation or may be performed after the simulation based on simulation results.

At 630, in the illustrated embodiment, selects at least a portion of sequential circuit elements coupled to the portion of the clock tree (e.g., that receive their clock signal from the portion) to be implemented in the circuit using a low-power cell for performing a particular circuit function (e.g., a flip-flop function), where the low-power cell has lower switching power consumption per bit relative to one or more other types of cells used to implement the particular circuit function within the circuit design. The design may be taped-out using the selected low-power cells. Therefore, in various embodiments an apparatus such as an integrated circuit may include low-power sequential that is selected according to any of the techniques disclosed herein.

In some embodiments, the selecting may include not selecting a second portion of the sequential circuitry for implementation using a low-power cell, even though the portion has high simulated switching activity, e.g., based on timing constraints for the second portion or power consumption constraints for combinational circuitry coupled to the second portion. In some embodiments, path margining or clock delaying may be used to meet timing constraints for sequential circuitry coupled to the portion of the clock tree.

The techniques disclosed herein may allow automated design tools to significantly reduce dynamic power consumption of integrated circuits while still meeting other design constraints such as timing constraints.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   performing, by a computing system, a simulation of a circuit using design information that specifies a circuit design for the circuit, wherein the design information specifies a clock tree with a plurality of hierarchically arranged clock gating elements;
   determining, by the computing system, a portion of the clock tree based on an amount of clock gating, during the simulation, by one or more of the clock gating elements that are configured to gate clock signals to the portion of the clock tree;
   over-constraining timing parameters for sequential circuit elements coupled to the determined portion of the clock tree to create additional timing slack on one or more paths within the determined portion;
   selecting, by the computing system, at least a portion of sequential circuit elements coupled to the determined portion of the clock tree to be implemented in the circuit design using a low-power cell for performing a particular circuit function, wherein the low-power cell is selected to have, among a plurality of available cell types for the function that meet timing constraints that are determined based on the additional timing slack created by the over-constraining, a lowest switching power consumption per bit; and
   modifying the circuit design based on the selected sequential circuit elements and fabricating a circuit that implements the modified circuit design.

2. The method of claim 1, wherein the low-power cell includes at least one of multi-bit sequential circuitry or sequential circuitry with low clock pin input capacitance.

3. The method of claim 1, further comprising:
   specifying, prior to the selecting, sequential circuit elements coupled to the portion of the clock tree as candidates for implementation using the low-power cell, wherein the selected portion of the specified sequential circuit elements corresponds to less than an entirety of the specified sequential circuit elements.

4. The method of claim 1, wherein the selecting includes not selecting a second portion of sequential circuitry coupled to the portion of the clock tree, based on at least one of: timing constraints for the second portion or power consumption constraints for combinational circuitry coupled to the second portion.

5. The method of claim 1, further comprising:
   performing one or more steps including at least one of: synthesizing the circuit design to generate a netlist, placing circuit elements associated with the netlist, synthesizing the clock tree, and routing communications pathways between the circuit elements, wherein the selecting is further based on additional simulation associated with at least one of the one or more steps.

6. The method of claim 1, wherein the simulating is based on a register-transfer level (RTL) description of the circuit design.

7. The method of claim 1, further comprising:
   modifying the design information to delay a clock signal to particular sequential circuit elements coupled to the portion of the clock tree, based on negative timing slack on paths ending at the particular sequential circuit elements, in response to determining that there is positive slack on output paths beginning at particular sequential circuit elements.

8. A non-transitory computer-readable medium having instructions stored thereon that are executable by a computing device to perform operations comprising:
performing a simulation of a circuit using design information that specifies a circuit design for the circuit, wherein the design information specifies a clock tree with a plurality of hierarchically arranged clock gating elements;
determining a portion of the clock tree based on an amount of clock gating, during the simulation, by one or more of the clock gating elements that are configured to gate clock signals to the portion of the clock tree;
over-constraining timing parameters for sequential circuit elements coupled to the determined portion of the clock tree to create additional timing slack on one or more paths within the determined portion;
selecting at least a portion of sequential circuit elements coupled to the determined portion of the clock tree to be implemented in the circuit design using a low-power cell for performing a particular circuit function, wherein the low-power cell is selected to have, among a plurality of available cell types for the function that meet timing constraints that are determined based on the additional timing slack created by the over-constraining, a lowest switching power consumption per bit; and
modifying the circuit design based on the selected sequential circuit elements and fabricating a circuit that implements the modified circuit design.

9. The non-transitory computer-readable medium of claim 8, wherein the low-power cell includes at least one of: multi-bit sequential circuitry or sequential circuitry with low clock pin input capacitance.

10. The non-transitory computer-readable medium of claim 8, wherein the selecting includes not selecting sequential circuitry coupled to a second portion of the clock tree for implementation using the low-power cell, based on at least one of: timing constraints for the second portion or power consumption constraints for combinational circuitry coupled to the second portion.

11. The non-transitory computer-readable medium of claim 8, further comprising:
performing one or more steps including at least one of: synthesizing the circuit design to generate a netlist, placing circuit elements associated with the netlist, synthesizing the clock tree, and routing communications pathways between the circuit elements, wherein the selecting is further based on simulation associated with at least one of the one or more steps.

12. The non-transitory computer-readable medium of claim 8, wherein the simulating is based on a register-transfer level (RTL) description of the circuit design.

13. The non-transitory computer-readable medium of claim 8, wherein at least a portion of the simulating is performed after synthesis.

14. The non-transitory computer-readable medium of claim 8, wherein the operations further comprise modifying the design information to delay a clock signal to particular sequential circuit elements coupled to the portion of the clock tree, based on negative timing slack on paths ending at the particular sequential circuit elements, in response to determining that there is positive slack on output paths beginning at particular sequential circuit elements.

* * * * *